(12) United States Patent
Ramkumar

(10) Patent No.: US 7,437,398 B2
(45) Date of Patent: Oct. 14, 2008

(54) PATTERN MATCHING ARCHITECTURE

(75) Inventor: Peramachanahalli Sachidananda Ramkumar, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 10/903,501

(22) Filed: Jul. 30, 2004

(65) Prior Publication Data
US 2006/0026413 A1    Feb. 2, 2006

(51) Int. Cl.
*G06F 17/15* (2006.01)
(52) U.S. Cl. .................................... 708/422
(58) Field of Classification Search .................. 708/422
See application file for complete search history.

(56) References Cited

U.S. PATENT DOCUMENTS

| | | | |
|---|---|---|---|
| 4,918,731 A | 4/1990 | Muroi | |
| 5,295,198 A | 3/1994 | Maney | |
| 5,717,908 A | 2/1998 | Dulong | |
| 5,825,921 A * | 10/1998 | Dulong | 382/181 |
| 5,933,806 A * | 8/1999 | Beyerlein et al. | 704/256.8 |
| 6,389,392 B1 * | 5/2002 | Pawlewski et al. | 704/241 |
| 2003/0229636 A1 * | 12/2003 | Mattausch et al. | 707/6 |

FOREIGN PATENT DOCUMENTS

| | | | |
|---|---|---|---|
| EP | 1 369 793 | | 12/2003 |
| JP | 61-138335 | * | 6/1986 |
| JP | 05-028273 | * | 2/1992 |
| JP | 04/294421 | * | 10/1992 |
| JP | 07-057090 | * | 3/1995 |
| JP | 2002-007413 | * | 1/2002 |
| JP | 2002-216131 | * | 8/2002 |
| JP | 2003-233851 | * | 8/2003 |

OTHER PUBLICATIONS

Yong-Chul Shin et al., *A Special-Purpose Content Addressable Memory Chip for Real-Time Image Processing*, IEEE Journal of Solid-State Circuits, vol. 27, No. 5, May 1992, pp. 737-744.
Haung, et al. *A Novel IP-Routing Lookup Scheme and Hardware Architecture for Multigigabit Switching Routers*, IEEE Journal Selected Areas in Communications, Jun. 1999, pp. 1093-1104.
Masao Akata, *A Scheduling Content-Addressable Memory for ATM Space-Division Switch Control*, IEEE International Solid-State Circuits Conference, Feb. 1991, New York.
Kabayashi M. et al. *A Longest Prefix Match Search Engine for Multi-Gigabit IP Processing*, IEEE International Conference on Communications, vol. 3, 2000, pp. 1360-1364.
Japanese Office Action dated Mar. 4, 2008 with English Language Translation.*

* cited by examiner

*Primary Examiner*—Tan V. Mai
(74) *Attorney, Agent, or Firm*—Trop, Pruner & Hu, P.C.

(57) ABSTRACT

A pattern matching unit includes a selection unit to divide an input datum and one or more reference templates into input bit-fields corresponding reference bit-fields, respectively. The number of bits in the input and reference bit-fields is programmable. A distance unit is also included to determine one or more distance measures between the input bit-fields and the corresponding reference bit-fields. The distance measures associated with reference bit-fields are combined into one or more net distance measures corresponding to the one or more reference templates.

28 Claims, 6 Drawing Sheets

PATTERN MATCHING ARCHITECTURE

BACKGROUND

Embodiments of the present invention relate generally to pattern recognition, and more specifically to rapid matching of data to reference templates or patterns.

In a general pattern matching process, reference templates are compared to input data to determine which reference template best matches the input data.

One pattern matching architecture is a general purpose computer running pattern recognition software. This architecture has the following advantages: a) it can accommodate a variety of pattern comparison algorithms due to the software implementation; and b) a large number of reference templates can typically be used since the number of reference templates is usually limited only by the amount of computer system memory. However, this architecture suffers from the following drawbacks: slow performance, high electrical power consumption, too large for many applications, expensive, and complex software. Such architectures are not well suited for applications that need rapid pattern matching or that must meet the low power and portability requirements of embedded applications.

Another pattern matching architecture uses a content addressable memory that includes an embedded hardware comparator in each memory cell to compare the contents of its memory location to a corresponding bit of the input data according to the embedded comparator's comparison function. This architecture has the advantages of being fast (due to its hardware implementation) and relatively small. However, it suffers from a number of disadvantages: 1) limitations regarding the type and complexity of comparison algorithms that can be used, 2) relatively high power consumption, 3) highly complex design at the memory cell level, and 4) not scalable to a large number of reference templates. Implementing a hardware comparator for each memory cell is expensive, precludes more complex comparison criteria, and limits the flexibility of implementing multiple comparison criteria. For example, such a pattern recognition architecture would typically only include an exact bit match comparison to determine which stored reference template, if any, matched all of the bits of the input data. More complex comparison criteria would be too complex and/or expensive to use in this architecture.

Although the foregoing architectures are suitable for some pattern recognition applications, other applications need a pattern matching architecture that is fast, provides a choice of multiple comparison algorithms (including more complex algorithms), and consumes relatively low power. Thus, a need exists for improved pattern matching architectures.

BRIEF DESCRIPTION OF THE DRAWINGS

Various embodiments of the present invention are illustrated by way of example and not limitation in the figures of the accompanying drawings, in which like references indicate similar elements.

DETAILED DESCRIPTION

A method, apparatus, and system for a pattern matching architecture are described. In the following description, for purposes of explanation, numerous specific details are set forth in order to provide a thorough understanding of various embodiments of the invention. It will be apparent, however, to one skilled in the art that embodiments of the invention can be practiced without these specific details. In other instances, structures and devices are shown in block diagram form in order to avoid obscuring embodiments of the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some example pattern matching applications are authentication (such as face, voice, fingerprint, signature, and iris matching), inventory (such as barcodes and radio frequency identification), communication (such as speech, audio, image recognition and compression, and header parsing), and industrial control (such as part inspection and predictive maintenance).

Input data from such an application may be compared to a set of reference patterns or templates according to one or more comparison algorithms to generate various distance measures between the real-time data and the reference templates. A distance measure is a determination of the difference between two data according to a distance formula or algorithm. Some example distance measures are bit exact match, hamming distance, Euclidean distance, mean magnitude distance, and correlation distance. Some distance measures may be used in some applications but not others. Certain applications may use multiple types of distance measures. Thus, an ability to choose a variety of one or more distance measures may be implemented.

In some applications, after the distance measures are generated, the distance measures may be further processed or classified to determine which reference templates of the selected set best compares to the input data according to one or more classification criteria. For example, it may be determined which reference templates are the best match, worst match, mean match, and/or median match for a given input datum. The types of decisions to be made based on the "matches" may vary with the application, so a pattern matching architecture that provides selectable classifications of distance measures may be implemented.

Figure 1:
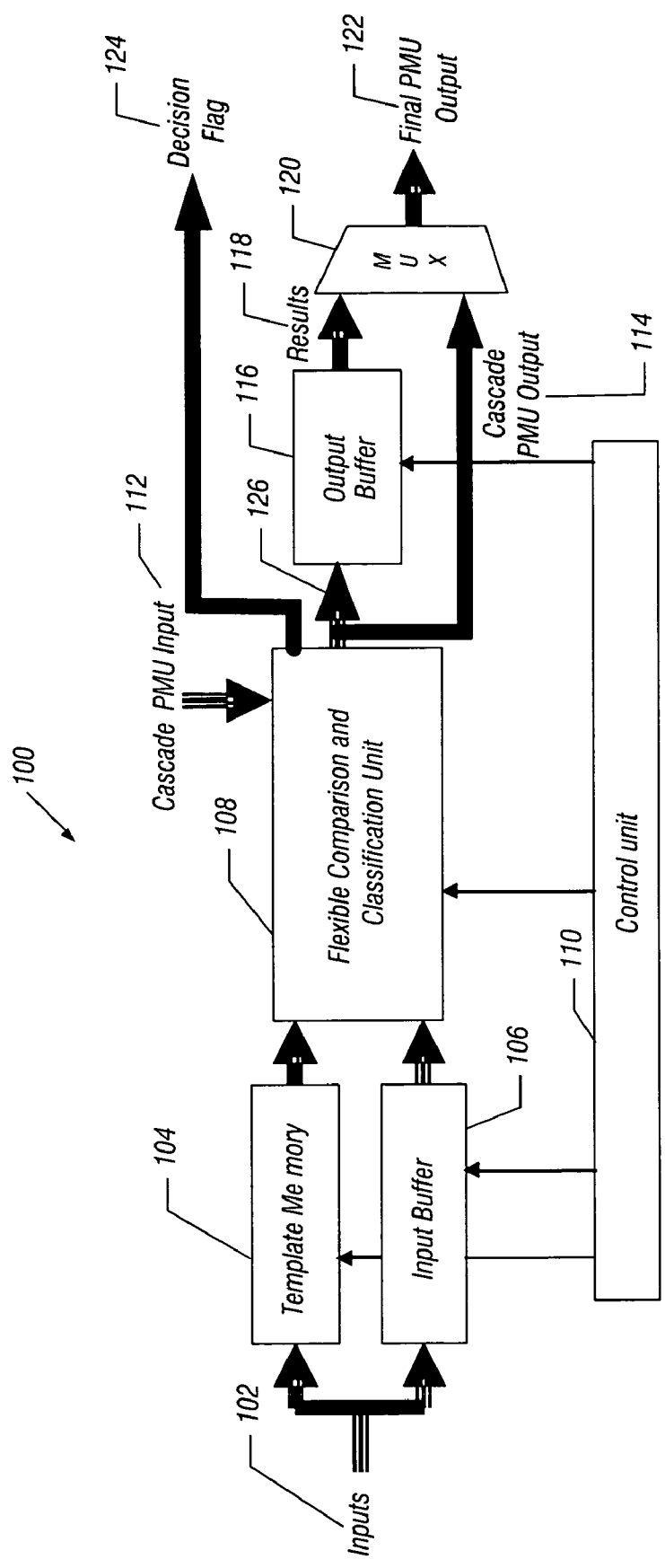
FIG. 1 is a block diagram of a pattern matching unit according to one embodiment of the present invention.

Referring now to FIG. 1, shown is a block diagram of a pattern matching unit 100 according to one embodiment of the present invention. The pattern matching unit 100 may provide an ability to select a set of one or more distance measures to be generated (e.g., bit exact match, hamming distance, Euclidean distance, mean magnitude distance, and/or correlation distance), may provide an ability to classify the distance measures according to one or more selected classification criteria (e.g., best match, worst match, mean match, and/or median match), and may include a look-up table mechanism with associated logical and arithmetic comparison mechanisms for matching an input datum to a set of reference templates and providing the index of the matching template(s) based on user selections.

In one embodiment, the pattern matching unit 100 may be integrated within a memory device such that the on-chip memory may be used to store large sets of reference templates that can be accessed very rapidly without occupying a host bus. In one embodiment, the pattern matching unit 100 may be embedded into processor as a pattern matching accelerator. In one embodiment, an embedded pattern matching unit 100 may be mapped to a compare instruction of the processor to provide fast, flexible, complex data comparison and classification while allowing the processor to perform other tasks. Such a processor may advantageously use an embedded pattern matching unit 100 for various applications, such as pattern recognition, branch prediction, intelligent caching, adaptive matched filtering, and instruction level encryption.

Still referring to FIG. 1, an input buffer 106 may receive input data via inputs 102 and store the input data for subsequent processing by a flexible comparison and classification unit 108. In one embodiment, the input buffer 106 is dual ported or double buffered to allow asynchronous loading of new input data even as previous input data are being retrieved for processing by the flexible comparison and classification unit 108.

A template memory 104 may be used to receive reference patterns or templates from inputs 102 and store the reference templates for subsequent processing by the flexible comparison and classification unit 108. In one embodiment, the template memory 104 may be dual ported or double buffered to allow the reference templates to be loaded and accessed simultaneously. In various embodiments, the template memory 104 may be based on various memory technologies to match the requirements of memory size, power, speed, non-volatility, etc of the target application. For example, the template memory 104 may be implemented with semiconductor devices such as read-only memories (ROMs), random access memories (RAMs), dynamic random access memories (DRAMs), erasable programmable read-only memories (EPROMs), flash memories, or electrically erasable programmable read-only memories (EEPROMs).

Still referring to FIG. 1, data or vectors from the input buffer 106 and template memory 104 may be presented to the inputs of the flexible comparison and classification unit 108. As will be described in more detail later in connection with FIG. 2, the flexible comparison and classification unit 108 may be configured to compare and classify different data widths, divide or slice the input data and reference templates into sub-fields or dimensions for comparison and classification, perform a variety of types of comparisons to generate a variety of different distance measures between the input data and reference templates (e.g., bit exact match, hamming distance, Euclidean distance, mean magnitude distance, and/or correlation distance), aggregate or combine the distance measures for the various dimensions of the input data to generate net distance measures, and classify the net distance measures according to one or more selected criteria (e.g., best match, worst match, mean match, and/or median match). The flexible comparison and classification unit 108 may also include a mechanism to make one or more decisions based on the identified matches and certain boundary conditions, and indicate those decisions via one or more decision flags 124. The flexible comparison and classification unit 108 may also include a cascade PMU input 112 to allow cascading of multiple pattern matching units 108 to accommodate larger numbers of reference templates or vector dimensions for comparison. Further details of one embodiment of the flexible comparison and classification unit 108 will be described later in connection with FIG. 2.

Still referring to FIG. 1, an output buffer 116 may store the output 126 from the flexible comparison and classification unit 108 and may provide the buffered results 118 to a multiplexor 120. The output 126 from the flexible comparison and classification unit 108 may include the index value of the identified reference template matches, the matching reference templates, the associated net distance measures, and/or other relevant match data. In one embodiment, the output buffer 116 is a first-in-first-out (FIFO) stack. In one embodiment, the multiplexor 120 receives the buffered results 118 from the output buffer 116 and also receives the output 126 directly from the flexible comparison and classification unit 108. In one mode (e.g., standalone PMU mode), the multiplexor 120 may provide the buffered results 118 to the final PMU output 122. In another mode (e.g., a cascade PMU mode), the multiplexor 120 may provide the output of the flexible comparison and classification unit 108 directly to the final PMU output 122. The final PMU output 122 may be provided to host system or other device as the final comparison/classification output of the flexible comparison and classification unit 108.

In one embodiment, the output buffer 116 may work in conjunction with a control unit 110 to generate appropriate flags (e.g., underflow, overflow, half-full) to provide status information to the host system. Such flags may enable the host system to poll the flags periodically and respond after a selected number of input vectors have been compared and classified. In this manner, the host system may perform other tasks while the pattern matching unit 100 compares and classifies a set of input vectors.

Still referring to FIG. 1, the control unit 110 may provide various configuration options for the pattern matching unit 100. For example, the control unit 110 may control the data sizes/widths, the numbers and/or widths of vector dimensions into which input data and reference templates will be divided, the selection of one or more distance measures to be generated in each comparison, the selection of one or more classification criteria to be used, and the selection of various pattern matching unit modes, such as cascade modes, etc. The control unit 110 may also control the sequencing of data processing and transfer among the various units of the pattern matching unit 100. The control unit 110 may also provide an external interface for a host system or other device to interact with the pattern matching unit 100. In one embodiment, the external interface is a memory mapped interface. In one embodiment, the external interface is an input/output (I/O) mapped interface. Further details of one embodiment of the control unit 110 will be described later in connection with FIG. 3.

Figure 2:
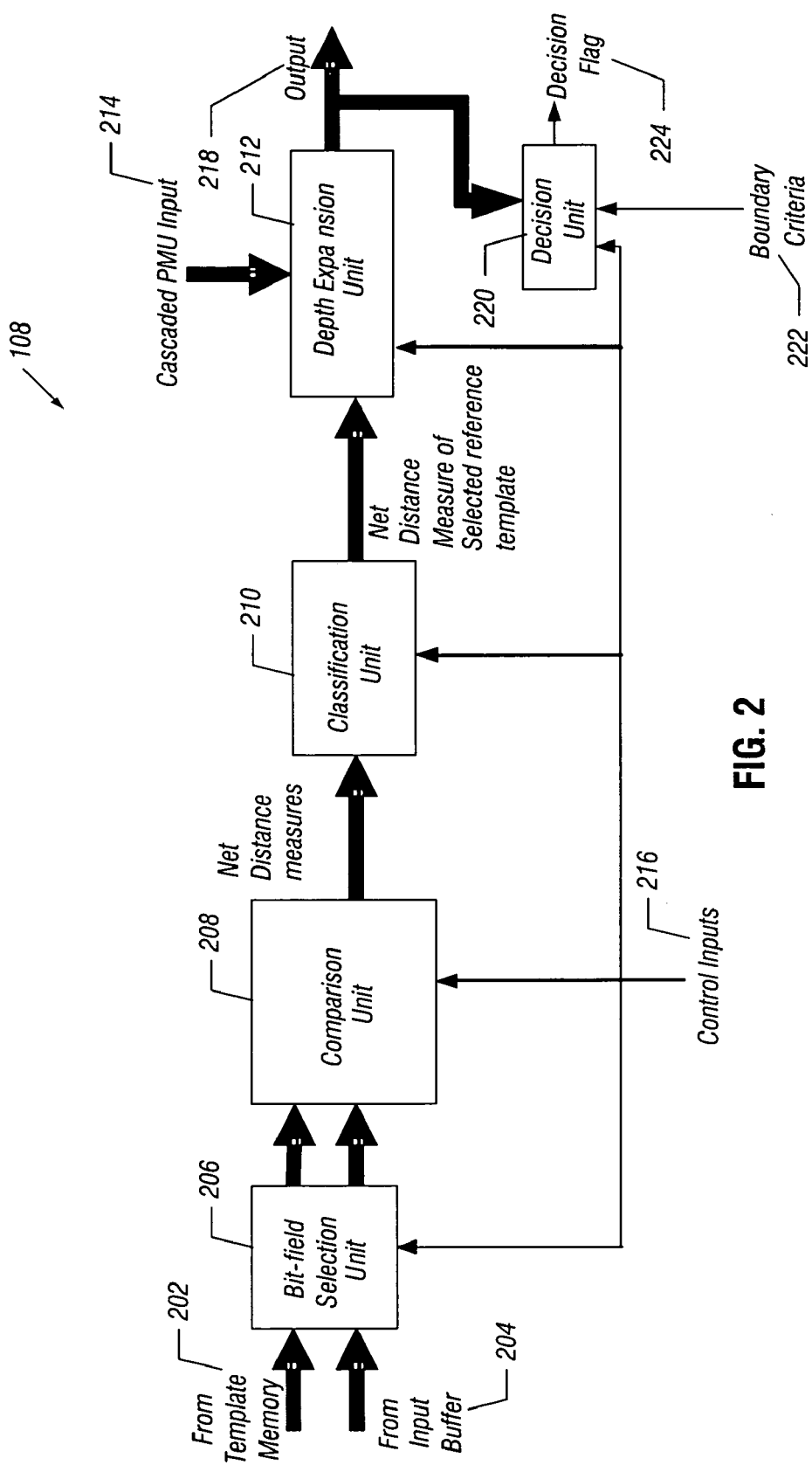
FIG. 2 is a block diagram of the flexible comparison and classification unit of FIG. 1 according to one embodiment of the present invention.

Referring now to FIG. 2, shown is a more detailed block diagram of the flexible comparison and classification unit 108 of FIG. 1 according to one embodiment of the present invention. A bit-field selection unit 206 may be configured to handle different sizes or bit widths of input data 204 and reference templates 202 from the input buffer 106 and template memory 104, respectively. The input data 204 and reference templates 202 may represent data or vectors that may have various dimensions or sub-fields. The bit-field selection unit 206 may be configured to slice or divide the input data 204 and reference templates 202 into one or more bit fields of configurable size representing various dimensions of the vectors. For example, the input data 204 and reference templates 202 could be 32-bit vectors comprising four dimensions of red, green, blue, and intensity of color display pixel data. In this case, the bit-field selection unit 206 could be configured to handle 32-bit data widths and to divide or slice the 32-bit input data 204 and 32-bit reference templates 202 into four 8-bit chunks or bit-fields, representing the following vector dimensions: 8-bits red (R); 8-bits of green (G); 8-bits of blue (B); and 8-bits intensity (I).

Still referring to FIG. 2, a comparison unit 208 may compare each bit-field or dimension of the input data 204 to the corresponding bit-field or dimension of the reference template 202 according to one or more comparison algorithms to generate one or more distance measures, depending on the configuration. In one embodiment, the comparison unit 208 may multiply the distance measure for each dimension with a corresponding weighting factor, which may be retrieved from an internal register. For example, a particular color vector matching application may determine that red and luminance are more important comparison dimensions than blue and green. In this case, weighting factor values of 0.90, 0.30, 0.40, and 0.95 could be used for the red, green, blue, and luminance dimensions, respectively. In one embodiment, the comparison unit 208 may aggregate or combine the distance measures (with or without having applied the weighting factors, depending on the configuration) from all of the bit-fields or dimensions to generate a net distance measure between the input data 204 and the reference template 204.

Depending on the target application, an embodiment of the present invention may be configured to use one or more comparison algorithms to generate one or more distance measures. Some useful distance measures are bit exact match, hamming distance, Euclidean distance, mean magnitude distance, and correlation distance. These distance measures will now be briefly described. A bit exact comparison determines whether there is an exact bit-for-bit match between two data being compared by comparing each of the corresponding bits of the two data. For example, input vector '0101 1101' is a bit exact match of reference template '0101 1101' but is not a bit exact match of reference template '0101 1100'. A hamming distance measure may be determined by dividing the total number of corresponding bits that match by the total bit width (total number of matching bits/total bit width). For example, the hamming distance between input vector '1011 0110 1010' and reference template '0101 1101 0111' is 3/12 or 0.25 (because, starting at the right position, the $2^{nd}$, $7^{th}$, and $9^{th}$ corresponding bits match and the data bit-width is 12-bits). Euclidean distance can be computed using the formula $(X-Y)^2$ for vectors having a single dimension, or $$\sum_{i=1}^{n}(X_i - Y_i)^2$$

for vectors having n dimensions or sub-fields $X_1 \ldots X_n$ and $Y_1 \ldots Y_n$. Mean magnitude distance can be computed using the formula |X−Y| for vectors having a single dimension, or $$\sum_{i=1}^{n}|X_i - Y_i|$$

for vectors having n dimensions or sub-fields $X_1 \ldots X_n$ and $Y_1 \ldots Y_n$. Correlation distance can be computed using the formula X·Y for vectors having a single dimension, or $$\sum_{i=1}^{n}X_i \cdot Y_i$$

for vectors having n dimensions or sub-fields $X_1 \ldots X_n$ and $Y_1 \ldots Y_n$.

Still referring to FIG. 2, the comparison unit 208 may compare each input datum 204 to multiple reference templates 202 and provide the net distance measures associated with each input datum to a classification unit 210. The classification unit 210 may be configured to identify the reference templates 202 that match the input datum 204 according to one or more selected classification criteria. For example, the classification unit 210 may be configured to determine which of the reference templates are the best match, worst match, mean match and/or median match for each input datum. The best match is the reference template of a set having a net distance measure that compares most favorably to the input datum 204 according to a given classification criteria. The worst match is the reference template having a net distance measure that compares least favorably to the input datum 204 according to a given classification criteria. The mean match is the reference template having a net distance measure that is closest to the average of a set of net distance measures. The median match is the reference template having a net distance measure that is closest to the median of a set of net distance measures. In one embodiment, the flexible comparison and classification unit 108 may log the index value of the reference template and net distance measures corresponding to the identified matches.

Still referring to FIG. 2, in one embodiment the flexible comparison and classification unit 108 may include a depth expansion unit 212 to classify selected matches from cascaded pattern matching units. For example, multiple pattern matching units 100 (of FIG. 1) may be cascaded to increase speed (e.g., multiple units processing a given input datum in parallel) or increase the number of reference templates available for comparison. When the depth expansion mode is selected, the depth expansion unit 212 may compare its classified matches to those of other pattern matching units provided on cascaded PMU input 214 to determine the best overall matches from the selected matches of the multiple pattern matching units 100. When the depth expansion mode is not selected, the depth expansion unit 212 may simply copy its input to its output 218. Further details of one embodiment of a cascaded pattern matching architecture will be described later in connection with FIG. 4.

Still referring to FIG. 2, in one embodiment the flexible comparison and classification unit 108 may also include a decision unit 220. The decision unit 220 may receive the output 218 from the depth expansion unit 212 (which may include the identified matches and associated distance measure) and may also receive one or more boundary criteria 222 indicating decision criteria or thresholds. The decision unit 220 may compare the output 218 to the boundary criteria 222 and generate one or more decision flags 224 to indicate various decisions by the pattern matching unit 100 based on the comparison. For example, in a fingerprint matching application the decision unit 220 may be configured to assert a 'fingerprint match' flag if the value of the closest net Euclidean distance measure is less than a predetermined value. In one embodiment, the decision unit 220 may be used in a pattern matching unit 100 that is intended for standalone use in embedded applications. Various control inputs 216 may also be provided to control the timing, sequencing, and overall functions of the flexible comparison and classification unit 108.

Figure 3:
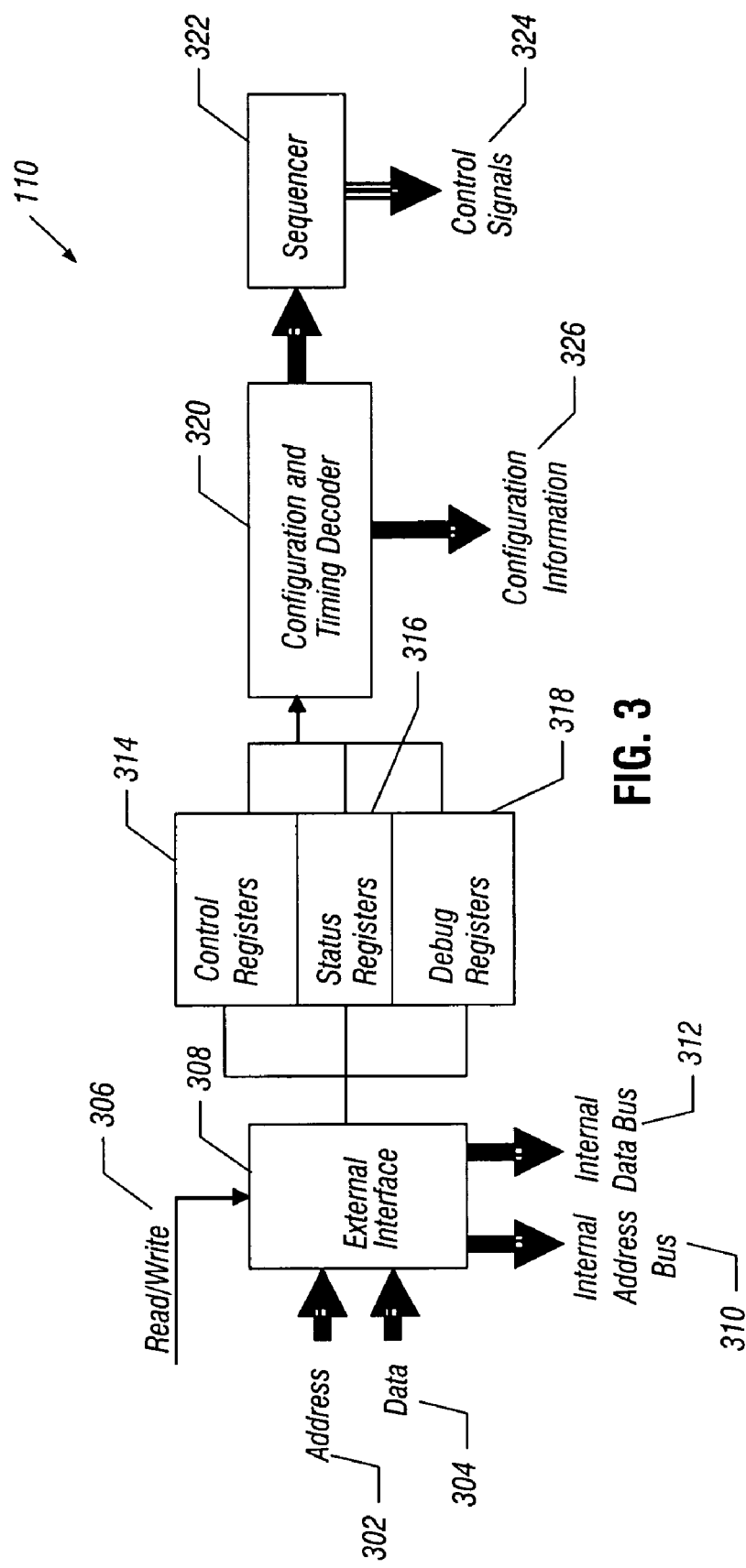
FIG. 3 is a block diagram of the control unit of FIG. 1 according to one embodiment of the present invention.

Referring now to FIG. 3, shown is a block diagram of the control unit 110 of FIG. 1 according to one embodiment of the present invention. An external interface 308 allows a host system or other device to interact with the pattern matching unit 100 via address 302, data 304, and read/write 306 signals. Using the external interface 308, a host device or system can store templates in the template memory 104, load data to the input buffer 106, and read results from the output buffer 116. Communication internal to the pattern matching unit 100 of address and data information provided by the host via address inputs 302 and data inputs 304 may be done via an internal address bus 310 and an internal data bas 312.

In one embodiment, the control unit 110 may provide a memory mapped interface for the pattern matching unit 100 that uses four locations of a host system's memory space. Example mappings are shown in Table 1.

TABLE 1

| Location 1 | Read/Write Template Memory |
| Location 2 | Write Input Buffer/Read Output Buffer |
| Location 3 | Write Control Registers/Read Status Registers |
| Location 4 | Read/Write Debug Registers |

In one embodiment, the control registers 314 may include the following: a) start address for templates in template memory 104; b) number of templates to be compared; c) bit-field width per dimension; d) number of vector dimensions per vector; e) depth expansion on/off; and f) selection of distance measures. In one embodiment, the control unit 110 may include status registers 316 that may include various flags (e.g., done/not done, cascade mode, memory check). In one embodiment, the control unit 110 may include debug registers 318 to provide various debug operations.

Still referring to FIG. 3, a configuration and timing decoder 320 provides configuration information 326 to the pattern matching unit 100. Sequencer 322 provides control signals 324 to control the timing and operation of the various functional blocks of the pattern matching unit 100.

Figure 4:
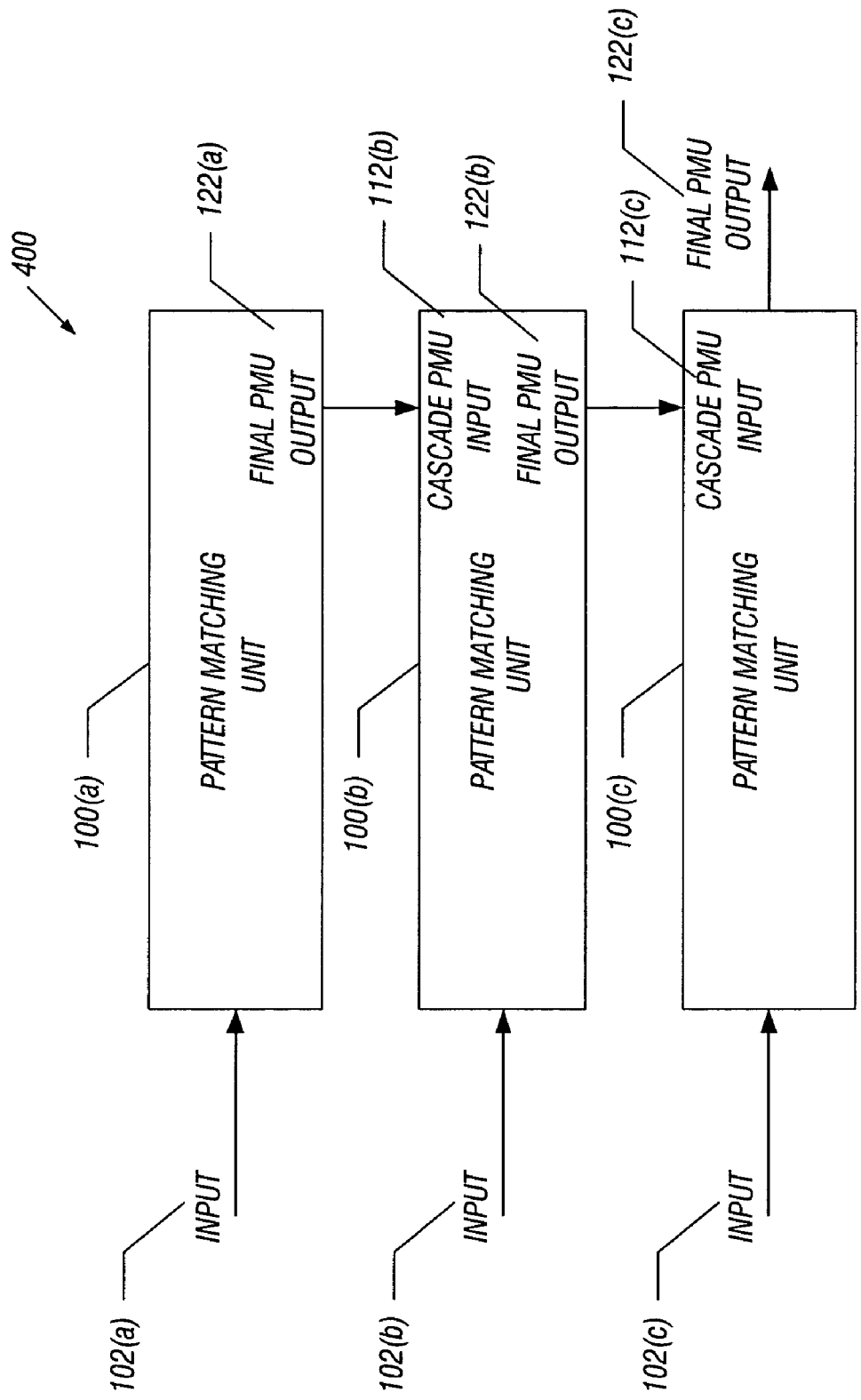
FIG. 4 is a block diagram of a cascaded pattern matching architecture according to one embodiment of the present invention.

Referring now to FIG. 4, shown is a block diagram of a cascaded pattern matching architecture 400 according to one embodiment of the present invention. FIG. 4 shows how multiple pattern matching units 100 (of FIG. 1) can be cascaded to increase speed (e.g., multiple units processing one or more input data in parallel) and/or increase the number of reference templates available for comparison. Input data is provided via inputs 102(a), 102(b), and 102(c) to pattern matching units 100(a), 100(b), and 100(c), respectively. The pattern matching units 100(a), 100(b), and 100(c) may be connected in a cascade mode by connecting the final PMU output 122(a) of pattern matching unit 100(a) to the cascade PMU input 122(b) of pattern matching unit 100(b) and the final PMU output 122(b) of pattern matching unit 100(b) to the cascade PMU input 112(c) of pattern matching unit 100 (c). In this embodiment the depth expansion units 212 of each of the pattern matching units 100(a), 100(b), and 100(c) work together to determine the best overall matches compared and classified by the multiple pattern matching units 100 and provide the best overall match data on final PMU output 122(c). In one embodiment, a cascade architecture may be used to allow comparison of a larger number of reference templates. For example, the same input data could be compared in parallel to different sets of reference templates stored in multiple cascade-connected pattern matching units. In one embodiment, the same sets of reference templates could be stored in multiple cascade-connected pattern matching units to increase the speed in which a set of input data may be compared and classified.

Embodiments may be implemented in logic circuits, state machines, microcode, or some combination thereof. Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), dynamic random access memories (DRAMs), erasable programmable read-only memories (EPROMs), flash memories, electrically erasable programmable read-only memories (EEPROMs), magnetic or optical cards, network storage devices, or any type of media suitable for storing electronic instructions.

Example embodiments may be implemented in software for execution by a suitable computer system configured with a suitable combination of hardware devices.

Figure 5:
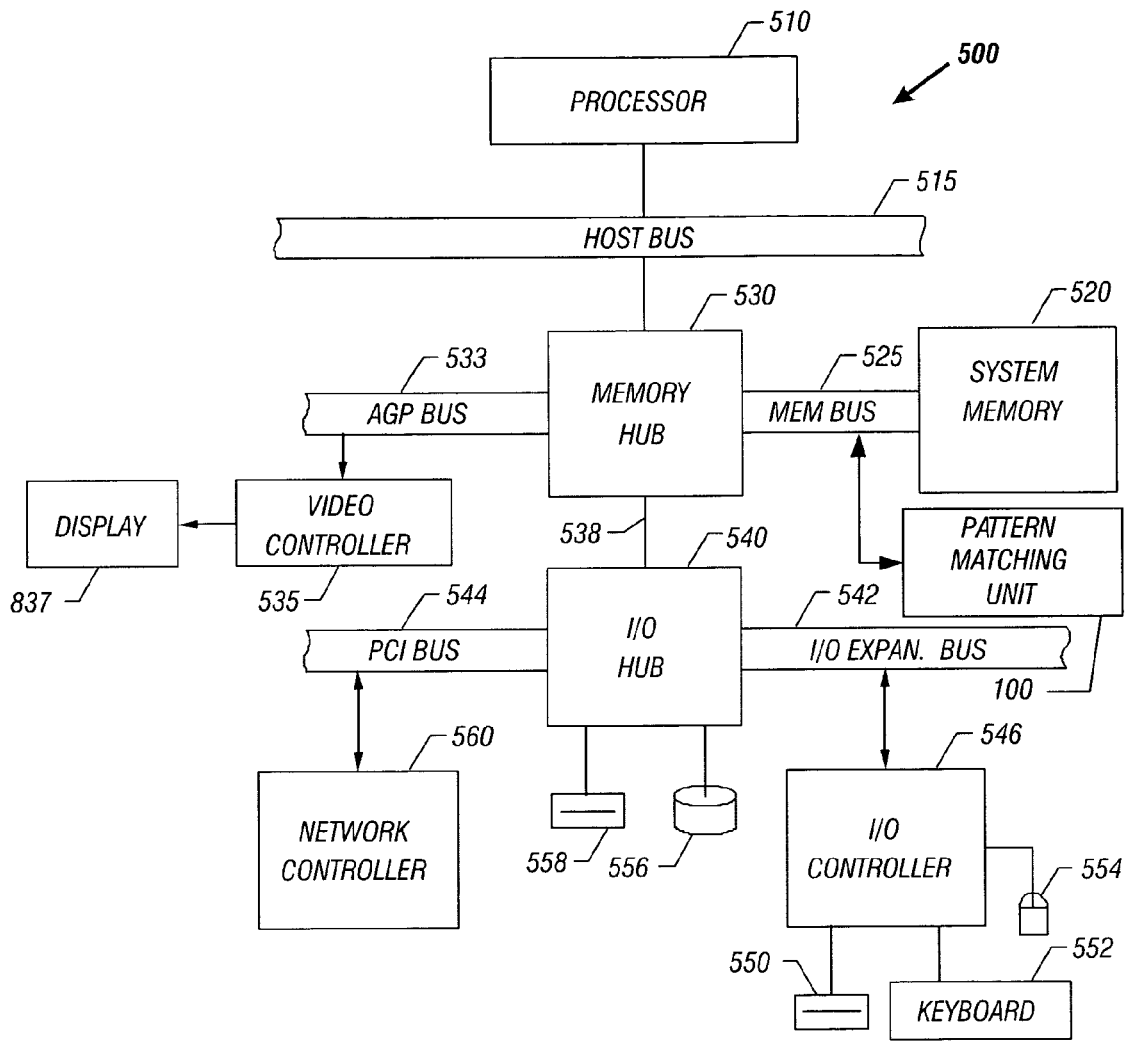
FIG. 5 is a block diagram of a computer system with which embodiments of the present invention may be used.

Referring now to FIG. 5, shown is a block diagram of computer system 500 with which embodiments of the invention may be used. In one embodiment, computer system 500 includes a processor 510, which may include a general-purpose or special-purpose processor such as a microprocessor, microcontroller, a programmable gate array (PGA), and the like. As used herein, the term "computer system" may refer to any type of processor-based system, such as a desktop computer, a server computer, a laptop computer, or the like, or other type of host system.

The processor 510 may be coupled over a host bus 515 to a memory hub 530 in one embodiment, which may be coupled to a system memory 520 (e.g., a dynamic RAM) via a memory bus 525. The memory hub 530 may also be coupled over an Advanced Graphics Port (AGP) bus 533 to a video controller 535, which may be coupled to a display 537. The AGP bus 533 may conform to the Accelerated Graphics Port Interface Specification, Revision 2.0, published May 4, 1998, by Intel Corporation, Santa Clara, Calif.

A pattern matching unit 100 (of FIG. 1) may be coupled to the memory hub 530 via memory bus 525. In this embodiment, the pattern matching unit 100 may be a memory mapped device. In another embodiment, the pattern matching unit 100 may be an input/output (I/O) mapped device. In one embodiment, the pattern matching unit 100 may be embedded into the processor 510 as a pattern matching accelerator. In one embodiment, an embedded pattern matching unit 100 may be mapped to a compare instruction of the processor 510 to provide fast, flexible, complex data comparison and classification while allowing the processor 510 to perform other tasks. The processor 510 may advantageously use the pattern matching unit 100 for various applications, such as pattern recognition, branch prediction, intelligent caching, adaptive matched filtering, and instruction level encryption.

The memory hub 530 may also be coupled (via a hub link 538) to an input/output (I/O) hub 540 that is coupled to a input/output (I/O) expansion bus 542 and a Peripheral Component Interconnect (PCI) bus 544, as defined by the PCI Local Bus Specification, Production Version, Revision 2.1 dated June 1995. The I/O expansion bus 542 may be coupled to an I/O controller 546 that controls access to one or more I/O devices. As shown in FIG. 5, these devices may include in one embodiment storage devices, such as a floppy disk drive 550 and input devices, such as keyboard 552 and mouse 554. The I/O hub 540 may also be coupled to, for example, a hard disk drive 556 and a compact disc (CD) drive 558, as shown in FIG. 5. It is to be understood that other storage media may also be included in the system.

The PCI bus 544 may also be coupled to various components including, for example, a network controller 560 that is coupled to a network port (not shown). Additional devices may be coupled to the I/O expansion bus 542 and the PCI bus 544, such as an input/output control circuit coupled to a parallel port, serial port, a non-volatile memory, and the like.

Although the foregoing description makes reference to specific components of the system 500, it is contemplated that numerous modifications and variations of the described and illustrated embodiments may be possible. More so, while FIG. 5 shows a block diagram of a system such as a personal computer, it is to be understood that embodiments of the present invention may be implemented in a specialized pattern recognition device, a personal digital assistant (PDA) or the like.

Figure 6:
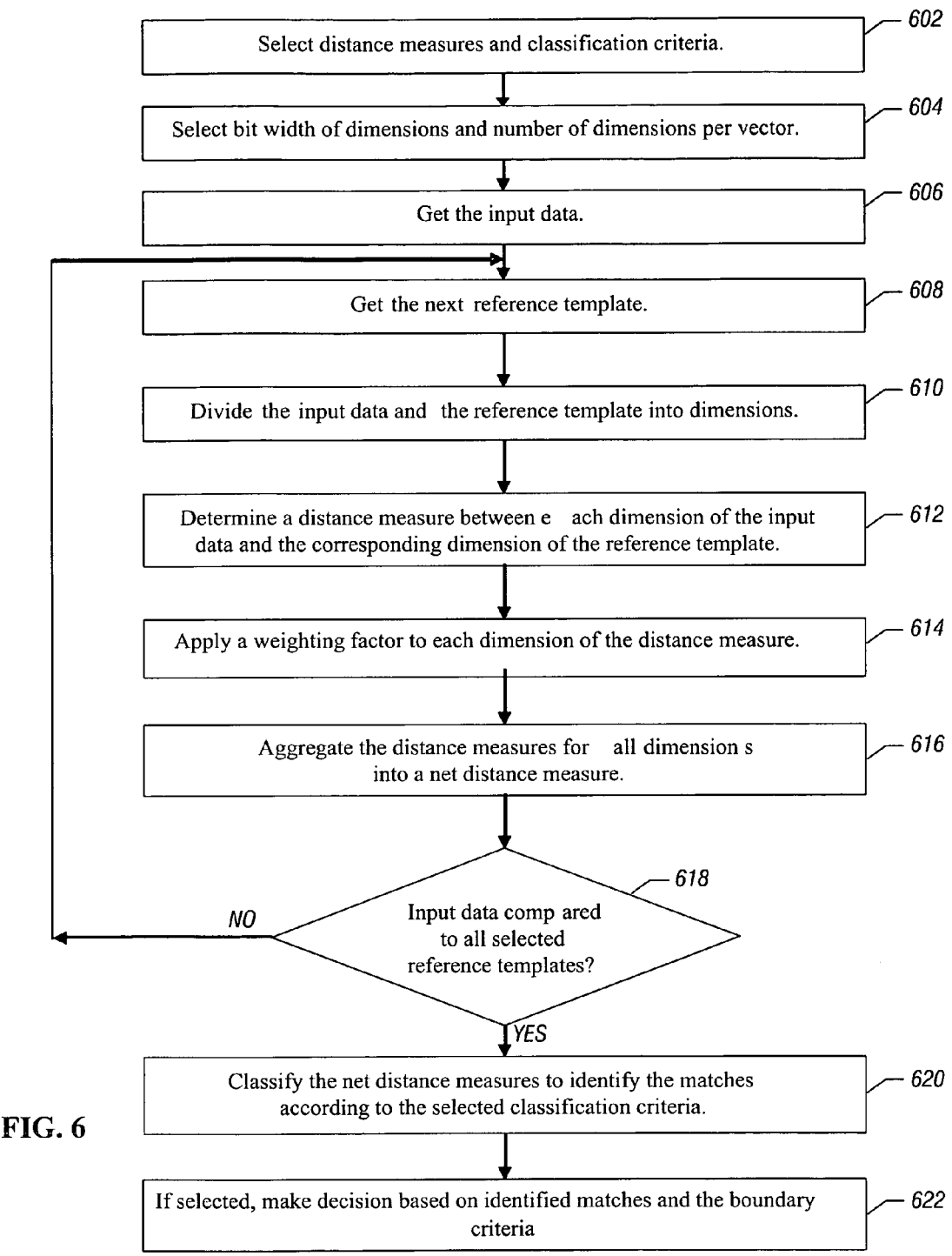
FIG. 6 is a flow diagram illustrating a pattern matching method according to an embodiment of the present invention.

Referring now to FIG. 6, shown is a flow diagram illustrating a pattern matching method according to an embodiment of the present invention. Configuration options may allow the selection of one or more distance measures or comparison algorithms to be used in comparing input data to reference templates or patterns, and may also allow the selection of one or more classification criteria that may be used to identify one or more reference templates that "best" match a given input datum according to the one or more selected criteria (block 602). Configuration options may allow the selection of the bit width or size of the dimensions of the input data and reference templates, and may also allow the selection of the size and/or number of dimensions for each input data and reference template (block 604). In one embodiment, configuration options may provide for selection of the overall bit width of the input data and reference templates and the number of dimensions for each input data and reference template.

After the configuration options are set, the pattern matching process proceeds by fetching an input datum that is to be compared and classified (block 606). A reference template against which the input datum will be compared is also fetched (block 608). To provide flexibility in comparing data having multiple dimensions, the input datum and reference template may each be divided into multiple dimensions or bit-fields (block 610) according to the configuration options to allow distance measures to be determined for each corresponding dimension of the input datum and reference template (block 612). Once the distance measures for each dimension have been determined, one or more weighting factors may be applied to the distance measures associated with the one or more dimensions (block 614). Then the distance measures may be aggregated or combined into a net distance measure for that input datum and reference template (block 616). Blocks 608 through 616 may be repeated until a given reference datum has been compared to all of the selected reference templates (diamond 618). If the input datum has been compared to all of the reference templates, the net distance measures may be classified according to the selected classification criteria to determine which distance measures (and corresponding reference templates) "best" match the input datum (block 620). In one embodiment, the matches identified in block 620 may be compared against one or more boundary criteria and one or more decisions may be made based on the comparisons (block 622).

Thus, a method, apparatus, and system for a pattern matching architecture have been described. While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   a first unit to divide an input datum into input bit-fields and to divide one or more reference templates into corresponding reference bit-fields, wherein the number of bits in the input bit-fields and the reference bit-fields is programmable;
   a second unit to determine one or more distance values between the input bit-fields and the corresponding reference bit-fields and to combine the one or more distance values associated with the reference bit-fields into one or more net distance values corresponding to the one or more reference templates; and
   a storage unit to store the one or more net distance values.

2. The apparatus of claim 1, wherein the number of bits in the input datum and the reference templates is programmable.

3. The apparatus of claim 1, wherein the second unit is adapted to apply one or more weighting factors to the distance values associated with each reference template before they are combined into the one or more net distance values.

4. The apparatus of claim 1, wherein the second unit is adapted to be configurable to determine one or more types of distance values and net distance values that include at least one of exact bit match, hamming distance, Euclidean distance, mean magnitude distance, and correlation distance.

5. The apparatus of claim 1, further comprising a memory to store the input datum and the reference templates, and wherein the apparatus is implemented on a single integrated circuit with a processor, and is mapped to a compare instruction of the processor.

6. The apparatus of claim 1, further comprising a host interface to exchange the input datum, the reference templates, control data, and status data with the apparatus.

7. The apparatus of claim 6, wherein the host interface is memory mapped or input/output (I/O) mapped.

8. The apparatus of claim 1, further comprising a classifier unit to classify the one or more net distance values according to one or more selectable classification criteria.

9. The apparatus of claim 8, wherein the selectable classification criteria include one or more of best match, worst match, mean match, and median match.

10. The apparatus of claim 8, further comprising a cascade unit to receive other net distance values and compare the other net distance values with the one or more classified net distance values according to the one or more selectable classification criteria.

11. The apparatus of claim 8, further comprising a decision unit to generate one or more decision flags based on a comparison of the one or more classified net distance values to one or more boundary criteria.

12. A method comprising:
   dividing an input datum into input bit-fields according to a programmable bit-field width;
   dividing one or more reference templates into reference bit-fields according to the programmable bit-field width, wherein the reference bit-fields correspond to the input bit-fields;
   determining distance values between the input bit-fields and the corresponding reference bit-fields;
   combining the distance values into one or more net distance values corresponding to the one or more reference templates; and storing the one or more net distance values in a storage medium.

13. The method of claim 12, further comprising configuring the number of bits in the input datum and the reference templates.

14. The method of claim 12, further comprising applying one or more weighting factors to the distance values before combining them into the one or more net distance values.

15. The method of claim 12, wherein one or more types of distance values and net distance values are determined including one or more of exact bit match, hamming distance, Euclidean distance, mean magnitude distance, and correlation distance.

16. The method of claim 12, further comprising classifying the one or more net distance values according to one or more selectable classification criteria.

17. The method of claim 16, wherein the selectable classification criteria include one or more of best match, worst match, mean match, and median match.

18. The method of claim 16 further comprising comparing other net distance values with the classified net distance values to further classify the classified net distance values in conjunction with the other net distance values.

19. The method of claim 16, further comprising generating one or more decision flags based on comparing the one or more classified net distance values to one or more boundary criteria.

20. A system comprising:
a dynamic random access system memory coupled to store instructions for execution by a processor; and
a cascaded pattern matching unit including a plurality of pattern matching units connected in a cascade mode, each to determine, in parallel, in response to a processor request, a set of distance measures between a common input datum and an individual set of reference templates and to identify and store an indication of the reference templates that best match the common input datum according to one or more classification criteria, wherein each pattern matching unit includes a first unit and a second unit, wherein the first unit is adapted to divide the common input datum into input bit-fields and to divide one or more individual reference templates into corresponding reference bit-fields, and wherein the second unit is adapted to determine one or more distance values between the input bit-fields and the corresponding reference bit-fields and to combine the one or more distance values associated with the reference bit-fields into one or more net distance values, and wherein an output of the cascaded pattern matching unit is to provide the best overall match of the best matches of each of the pattern matching units.

21. The system of claim 20, wherein the number of bits in the common input datum and the reference templates is programmable.

22. The system of claim 20, wherein the second unit is adapted to apply one or more weighting factors to the distance values before they are combined into the one or more net distance values.

23. The system of claim 20, wherein the cascaded pattern matching unit further includes a memory mapped or input/output (I/O) mapped host interface to exchange the common input datum, the reference templates, control data, and status data with the processor.

24. The system of claim 20, wherein the cascaded pattern matching unit further includes a classifier unit to classify the one or more net distance values according to one or more selectable classification criteria.

25. An article comprising a machine-accessible medium containing instructions that when executed enable a system to:
divide an input datum into input bit-fields according to a programmable bit-field width;
divide one or more reference templates into reference bit-fields according to the bit-field width, wherein the reference bit-fields correspond to the input bit-fields;
determine distance values between the input bit-fields and the corresponding reference bit-fields;
combine the distance values into one or more net distance values corresponding to the one or more reference templates; and
store the one or more net distance values in a storage.

26. The article of claim 25, further comprising instructions that when executed enable the system to configure the number of bits in the input datum and the reference templates.

27. The article of claim 25, further comprising instructions that when executed enable the system to determine one or more types of distance values and net distance values including one or more of exact bit match, hamming distance, Euclidean distance, mean magnitude distance, and correlation distance.

28. The article of claim 25, further comprising instructions that when executed enable the system to classify the one or more net distance values according to one or more selectable classification criteria including one or more of best match, worst match, mean match, and median match.

* * * * *